(12) United States Patent
Yang et al.

(10) Patent No.: US 9,990,171 B2
(45) Date of Patent: Jun. 5, 2018

(54) AUDIO DEVICE AND METHOD FOR AUTOMATICALLY ADJUSTING VOLUME THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 106 days.

(21) Appl. No.: 14/437,091

(22) PCT Filed: Sep. 30, 2014

(86) PCT No.: PCT/CN2014/087895
§ 371 (c)(1),
(2) Date: Apr. 20, 2015

(87) PCT Pub. No.: WO2015/165211
PCT Pub. Date: Nov. 5, 2015

(65) Prior Publication Data
US 2016/0253146 A1     Sep. 1, 2016

(30) Foreign Application Priority Data

Apr. 29, 2014   (CN) .......................... 2014 1 0177644

(51) Int. Cl.
*G06F 3/16*   (2006.01)
*H04N 5/60*   (2006.01)
(Continued)

(52) U.S. Cl.
CPC ............... *G06F 3/165* (2013.01); *H04N 5/60* (2013.01); *H04N 21/422* (2013.01);
(Continued)

(58) Field of Classification Search
CPC   H03G 3/30; H03G 3/20; H03G 3/005; H03G 3/32; H03G 7/00; H03G 7/06;
(Continued)

(56) References Cited

U.S. PATENT DOCUMENTS 6,298,247 B1 * 10/2001 Alperovich ......... H04M 1/6008
455/355
2003/0123680 A1 * 7/2003 Lee .......................... H03G 3/32
381/104

(Continued)

FOREIGN PATENT DOCUMENTS

CN     1589588 A     3/2005
CN     1882072 A     12/2006
(Continued)

OTHER PUBLICATIONS

International Search Report dated Jan. 28, 2015 issued in International Application No. PCT/CN2014/087895.
(Continued)

*Primary Examiner* — Sonia Gay
(74) *Attorney, Agent, or Firm* — Nath, Goldberg & Meyer; Joshua B. Goldberg; Stanley N. Protigal

(57) ABSTRACT

The present invention provides a method for automatically adjusting volume of an audio device, including steps of: S1, obtaining user identity information; S2, detecting an actual environmental volume; S3, determining user hearing condition according to the obtained user identity information, and adjusting a volume of the audio device according to corresponding relationship of user hearing condition, environmental volume and target volume of the audio device, so
(Continued)

that the volume of the audio device reaches a target volume corresponding to the detected actual environmental volume and the determined user hearing condition. Accordingly, the present invention further provides an audio device for automatically adjusting volume. With the present invention, the volume of the audio device can be automatically adjusted according to environmental volume with respect to different users.

12 Claims, 2 Drawing Sheets

(51) Int. Cl.
*H04N 21/422* (2011.01)
*H04N 21/439* (2011.01)
*H04N 21/441* (2011.01)
*H04N 21/45* (2011.01)
*H04R 29/00* (2006.01)

(52) U.S. Cl.
CPC ....... *H04N 21/439* (2013.01); *H04N 21/4394* (2013.01); *H04N 21/441* (2013.01); *H04N 21/4532* (2013.01); *H04R 29/001* (2013.01); *H04R 2430/01* (2013.01); *H04R 2499/11* (2013.01)

(58) Field of Classification Search
CPC ........ G06F 3/165; H04N 5/60; H04N 21/422; H04N 21/439; H04N 21/4394; H04N 21/441; H04N 21/4532; H04R 29/001; H04R 2430/01
See application file for complete search history.

(56) References Cited

U.S. PATENT DOCUMENTS

| | | | |
|---|---|---|---|
| 2005/0089177 A1* | 4/2005 | Hughes | H03G 3/32 381/86 |
| 2009/0232319 A1 | 9/2009 | Kao | |
| 2009/0304205 A1* | 12/2009 | Hardacker | H03G 3/301 381/104 |
| 2010/0111328 A1 | 5/2010 | Yu | |
| 2011/0095875 A1* | 4/2011 | Thyssen | G09G 5/10 340/407.1 |
| 2013/0128119 A1* | 5/2013 | Madathodiyil | H04N 21/4852 348/563 |
| 2014/0079243 A1* | 3/2014 | Appell | H03G 3/32 381/86 |
| 2015/0010169 A1* | 1/2015 | Popova | H04S 7/303 381/107 |

FOREIGN PATENT DOCUMENTS

| | | |
|---|---|---|
| CN | 1972120 A | 5/2007 |
| CN | 101060314 A | 10/2007 |
| CN | 101369805 A | 2/2009 |
| CN | 102113313 A | 6/2011 |
| CN | 102307287 A | 1/2012 |
| CN | 102413218 A | 4/2012 |
| CN | 103688531 A | 3/2014 |
| JP | 2007228385 A | 9/2007 |
| JP | 2013005208 A | 1/2013 |
| KR | 20120081424 A | 7/2012 |

OTHER PUBLICATIONS

1st office action issued in corresponding Chinese application No. 201410177644.8 dated Sep. 5, 2016.

* cited by examiner

_(1)_

AUDIO DEVICE AND METHOD FOR AUTOMATICALLY ADJUSTING VOLUME THEREOF

This is a National Phase Application filed under 35 U.S.C. 371 as a national stage of PCT/CN2014/087895, filed Sep. 30, 2014, an application claiming the benefit of Chinese Application No. 201410177644.8, filed Apr. 29, 2014, the content of each of which is hereby incorporated by reference in its entirety.

FIELD OF THE INVENTION

The present invention relates to the field of audio processing technology, and particularly relates to an audio device and a method for automatically adjusting volume of an audio device.

BACKGROUND OF THE INVENTION

In daily use of various audio devices (e.g., TV or the like), user's perception of the audio output from an audio device is affected by various factors, for example, when the user watches TV, the audio volume of a TV perceived by the user may be affected by the environmental sound, the distance between the user and the TV and the like. In order to hear the audio of the TV more clearly and reduce the impact on others, the volume of the TV needs to be adjusted.

Generally, the volume is adjusted by the user manually with a remote controller, but the environmental noise varies randomly, and repeated volume adjustments bring inconvenience to the user and also cause certain wear to the remote controller.

A patent document with publication number CN201859368U discloses a display capable of automatically adjusting volume according to ambience, the display is provided with a sound sensor to sense environmental volume, and then an obtained environmental volume curve is transmitted to a chip with a default standard volume preset therein The chip adjusts the volume by comparing the collected environmental volume with the preset default standard volume. Although it is achieved in a certain degree that the volume is adjustable according to the environmental volume, there is a certain limitation. For example, since different people have different hearing conditions (some people are more sensitive to noise, whereas some people are relatively insensitive to noise), their responses to the environmental noise are also different. The above-mentioned solution cannot meet the requirements of different people for volume adjustment. Therefore, in view of the problem of different responses of different people to the environmental volume, how to automatically adjust the volume of an audio device according to the environmental volume has become a technical problem to be solved urgently in the field.

SUMMARY OF THE INVENTION

An object of the present invention is to provide and an audio device and a method for automatically adjusting volume thereof, in order to automatically adjust, with respect to different users, a volume of an audio device according to environmental volume.

To achieve the above object, embodiments of the present invention provide a method for automatically adjusting volume of an audio device, including steps of:

S1: obtaining user identity information;

S2: detecting an actual environmental volume; and

S3: determining user hearing condition according to the obtained user identity information, and adjusting a volume of the audio device according to corresponding relationship of user hearing condition, environmental volume and target volume of the audio device, so that the volume of the audio device reaches a target volume corresponding to the detected actual environmental volume and the determined user hearing condition.

Preferably, prior to step S3, the method for automatically adjusting volume of the audio device further includes steps of:

S10: obtaining, with respect to each user hearing condition, a plurality of preset environmental volumes and characteristic target volumes in one-to-one correspondence with the plurality of preset environmental volumes;

S20: obtaining the corresponding relationship of user hearing condition, environmental volume and target volume of the audio device according to the preset environmental volumes and the characteristic target volumes in one-to-one correspondence with the preset environmental volumes obtained with respect to each user hearing condition; and S30: storing the corresponding relationship of user hearing condition, environmental volume and target volume of the audio device.

Preferably, the corresponding relationship of user hearing condition, environmental volume and target volume of the audio device is obtained by performing, with respect to each user hearing condition, linear fitting or quadratic curve fitting on the plurality of preset environmental volumes and the characteristic target volumes in one-to-one correspondence with the plurality of preset environmental volumes.

Preferably, the preset environmental volumes are obtained by fitting actual environmental volumes and simulated environmental volumes.

Preferably, the method for automatically adjusting volume of an audio device further includes steps of:

S4: detecting a distance between the audio device and the user;

S5. adjusting, according to the detected distance between the audio device and the user, the volume of the audio device in such a way that the volume of the audio device is increased when the detected distance between the audio device and the user is larger than a preset distance, and the volume of the audio device is decreased when the detected distance between the audio device and the user is smaller than the preset distance.

Accordingly, the embodiments of the present invention further provide an audio device, the volume of the audio device can be automatically adjusted, and the audio device includes:

a user identity obtaining unit, configured to obtain user identity information;

a volume detecting unit, configured to detect an actual environmental volume;

a storage unit, configured to store corresponding relationship of user hearing condition, environmental volume and target volume of the audio device; and a data processing unit, configured to receive the user identity information obtained by the user identity obtaining unit and the actual environmental volume detected by the volume detecting unit, determine user hearing condition according to the user identity information, and adjust a volume of the audio device according to the corresponding relationship of user hearing condition, environmental volume and target volume of the audio device stored in the storage unit, so that the volume of the audio device reaches a target volume corresponding to the actual environmental volume and the user hearing condition.

Preferably, the data processing unit fits, with respect to each user hearing condition, a relationship curve between a plurality of preset environmental volumes and characteristic target volumes in one-to-one correspondence with the plurality of preset environmental volumes, to obtain the corresponding relationship of user hearing condition, environmental volume and target volume of the audio device, and stores the corresponding relationship in the storage unit.

Preferably, the audio device for automatically adjusting volume further includes: an environmental volume simulation unit, which is electrically connected with the data processing unit and used for simulating environmental volume; and the preset environmental volumes are obtained by fitting actual environmental volumes and simulated environmental volumes.

Preferably, the audio device for automatically adjusting volume further includes: a distance detecting unit, which is electrically connected with the data processing unit and used for detecting a distance between a user and the audio device; and the data processing unit is capable of adjusting the volume of the audio device according to the distance between the audio device and the user detected by the distance detecting unit in such a way that the volume of the audio device is increased when the detected distance between the audio device and the user is larger than a preset distance; and the volume of the audio device is decreased when the detected distance between the audio device and the user is smaller than the preset distance.

Preferably, the distance detecting unit includes a camera device and/or an acoustic detection device.

In the embodiments of the present invention, the volume of the audio device can be adjusted according to the corresponding relationship of user hearing condition, environmental volume and target volume of the audio device, so that the volume of the audio device reaches a target volume corresponding to the detected actual environmental volume and the user. Therefore, the volume of the audio device is automatically adjusted with the environmental volume with respect to different users, thereby reducing manual adjustment of the volume of the audio device, and also prolonging the service life of the remote controller. Meanwhile, in the present invention, the volume of the audio device can be automatically adjusted according to the distance between a user and the audio device, so as to meet the requirements of different users at different distances for volume.

BRIEF DESCRIPTION OF THE DRAWINGS

The drawings, constituting a part of the description, are used for providing further understanding of the present invention, and explaining the present invention together with the following specific embodiments, rather than limiting the present invention. In the drawings.

DETAILED DESCRIPTION OF THE EMBODIMENTS

A detailed description of the specific embodiments of the present invention will be given below in conjunction with the accompanying drawings. It should be understood that the specific embodiments described herein are merely used for illustrating and explaining the present invention, rather than limiting the present invention.

Figure 1:
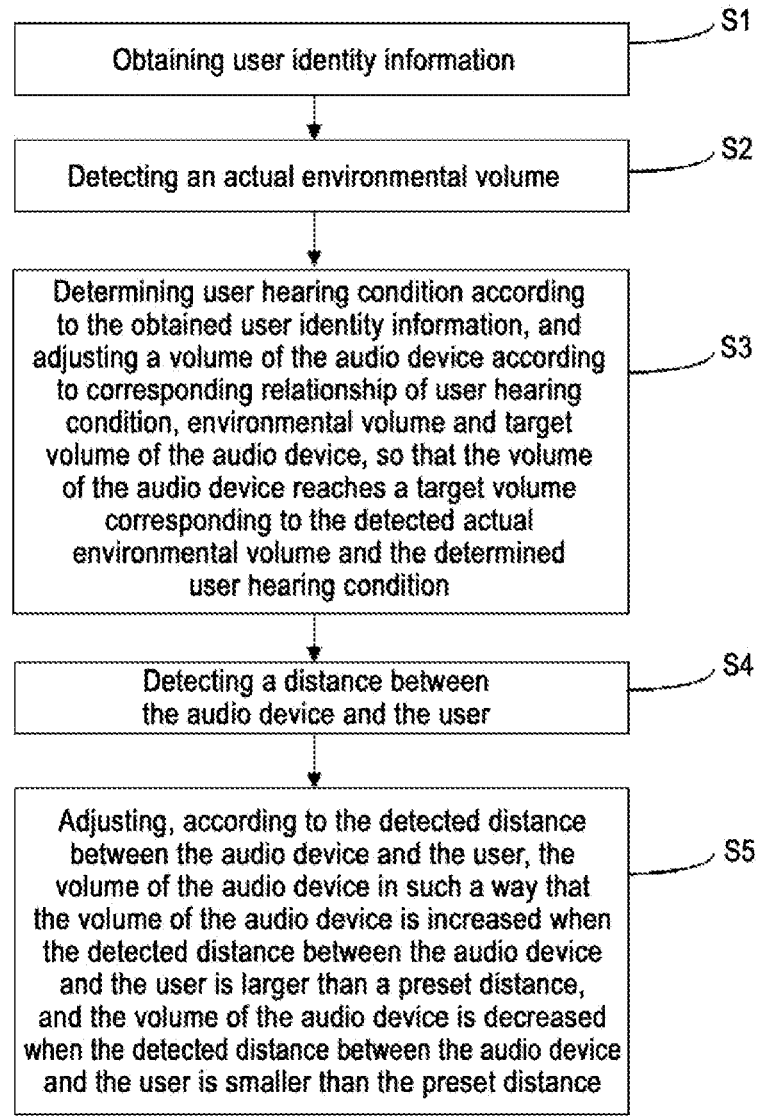
FIG. 1 is a flowchart of a method for automatically adjusting volume of an audio device, provided by an embodiment of the present invention.

As one aspect of the present invention, a method for automatically adjusting volume of an audio device is provided, and as shown in FIG. 1, the method for automatically adjusting volume of the audio device may include steps of:

S1: obtaining user identity information;

S2: detecting an actual environmental volume; and

S3: determining user hearing condition according to the obtained user identity information, and adjusting a volume of the audio device according to corresponding relationship of user hearing condition, environmental volume and target volume of the audio device, so that the volume of the audio device reaches a target volume corresponding to the detected actual environmental volume and the determined user hearing condition.

In daily life, the volume of an audio device perceived by a user is greatly related to the hearing condition of the user, and in the embodiments of the present invention, the volume of the audio device can be adjusted according to the corresponding relationship of user hearing condition, environmental volume and volume of the audio device, so that the volume of the audio device reaches the target volume corresponding to the user hearing condition and the environmental volume. Therefore, the volume of the audio device is automatically adjusted with the environmental volume with respect to different users, thereby reducing manual adjustment of the volume of the audio device, and also prolonging the service life of the remote controller.

In the embodiments of the present invention, the specific form of the user identity information is not limited, as long as the user hearing condition can be determined according to the user identity information. For example, the user identity information can include age of a user, and the user hearing condition can be deduced according to the age of the user; or, the user identity information can include facial features of a user, an image of the user's face can be obtained by a camera device, the facial features are extracted, and the user hearing condition is determined according to the facial features.

In the embodiments of the present invention, the volume of the audio device is adjusted to the target volume corresponding to the actual environmental volume and the user (i.e., the user hearing condition), the relationship of target volume, environmental volume and user can be simply understood in such a manner that there are a plurality of numerical value corresponding relationships between target volume and environmental volume, and each numerical value corresponding relationship corresponds to one type of users among a plurality of types of users (users with different hearing conditions). For example, when the user is determined to belong to a first type of users according to the user identity information, the corresponding relationship between target volume and environmental volume is a first numerical value corresponding relationship corresponding to the first type of users, and the volume of the audio device is adjusted according to the first numerical value corresponding relationship to reach the target volume corresponding to the actual environmental volume and the user; when the user is determined to belong to a second type of users according to the user identity information, the corresponding relationship between target volume and environmental volume is a second numerical value corresponding relationship corresponding to the second type of users, and the volume of the audio device is adjusted according to the second numerical value corresponding relationship to reach the target volume corresponding to the actual environmental volume and the user, and so on.

It can be understood that when the audio device is used for the first time, the volume of the audio device may be an initial volume set in the factory, in step S3, the volume of the audio device can be adjusted to the target volume corresponding to the actual environmental volume and the user from the initial volume. If the audio device is not used for the first time, in step S3, the volume of the audio device can be adjusted to the target volume corresponding to the actual environmental volume and the user from the volume when the audio device is turned off at last time.

In the embodiments of the present invention, the sequence in which step S1 and step S2 are performed is not limited, as long as the user identity information and the actual environmental volume can be obtained before the volume is automatically adjusted. Further, the method for automatically adjusting volume of the audio device can further include, prior to step S3, steps of:

S10: obtaining, with respect to each user hearing condition, a plurality of preset environmental volumes and characteristic target volumes in one-to-one correspondence with the plurality of preset environmental volumes;

S20: obtaining the corresponding relationship of user hearing condition, environmental volume and target volume of the audio device according to the preset environmental volumes and the characteristic target volumes in one-to-one correspondence with the preset environmental volumes obtained with respect to each user hearing condition; and S30: storing the corresponding relationship of user hearing condition, environmental volume and target volume of the audio device.

It can be understood that step S10, step S20 and step S30 are performed before the user uses the audio device. Specifically, in step S10, a developer may preset, with respect to each user hearing condition, a plurality of preset environmental volumes and characteristic target volumes in one-to-one correspondence with the plurality of preset environmental volumes. The plurality of preset environmental volumes may be a plurality of values within the range of the environmental volumes in the normal life of the user, then a relationship curve between preset environmental volume and characteristic target volume can be determined according to the plurality of preset environmental volumes and the characteristic target volumes in one-to-one correspondence with the plurality of preset environmental volumes, and accordingly the volume of the audio device corresponding to the actual environmental volume is determined according to the relationship curve. It is easy to understand that more values of the preset environmental volumes and the characteristic target volumes result in a more accurate relationship curve between preset environmental volume and characteristic target volume. The characteristic target volume may be set in various manners, for example, for a specific hearing condition, the value of each characteristic target volume may be higher than that of the preset environmental volume corresponding to the characteristic target volume by a certain amount (for example, 30 db or the like); alternatively, an experimental method may be adopted, the volume of the audio device is adjusted according to the specific hearing condition under each preset environmental volume until a user with the specific hearing condition can clearly hear the sound output from the audio device, and the volume of the audio device at this time is used as the characteristic target volume corresponding to the preset environmental volume.

By obtaining and storing the corresponding relationship of user hearing condition, environmental volume and target volume of the audio device, in a process of automatically adjusting the volume of the audio device, when the actual environmental volume is detected and the user identity information is obtained, the volume of the audio device is adjusted according to the relationship curve between preset environmental volume and characteristic target volume corresponding to the user hearing condition, such that the volume of the audio device corresponds to the actual environmental volume and the user hearing condition.

As mentioned above, the relationship of target volume, environmental volume and user can be simply understood as that there are a plurality of numerical value corresponding relationships between target volume and environmental volume, and each numerical value corresponding relationship corresponds to one type of users among a plurality of types of users. The numerical value corresponding relationship can be expressed by the relationship curve between preset environmental volume and characteristic target volume, namely, for each type of users (i.e., each user hearing condition), a plurality of preset environmental volumes and characteristic target volumes in one-to-one correspondence with the plurality of preset environmental volumes are obtained, so as to obtain the relationship curves between preset environmental volume and characteristic target volume in one-to-one correspondence with types of users. For different types of users, the relationship curves between preset environmental volume and characteristic target volume may be different. In general, the plurality of types of users may include old users with poor hearing, middle-aged users with general hearing and young users with good hearing, and accordingly, the relationship curve between preset environmental volume and characteristic target volume corresponding to the old users, the relationship curve between preset environmental volume and characteristic target volume corresponding to the middle-aged users and the relationship curve between preset environmental volume and characteristic target volume corresponding to the young users may be obtained. It is easy to understand that for the same preset environmental volume, the characteristic target volume corresponding to the old users is the highest, the characteristic target volume corresponding to the middle-aged users is the second highest, and the characteristic target volume corresponding to the young users is the lowest.

It can be understood that the classification of users is not limited to the above-mentioned classification of three types, and the users may also be divided into other types.

In the embodiments of the present invention, the manner in which the corresponding relationship of user hearing condition, environmental volume and target volume of the audio device is obtained is not limited, as long as the volume of the audio device can reach the target volume corresponding to the actual environmental volume and the user hearing condition. As an specific implementation of the present invention, the corresponding relationship of user hearing condition, environmental volume and target volume of the audio device is obtained by performing, with respect to each user hearing condition, linear fitting or quadratic curve fitting on the plurality of preset environmental volumes and the characteristic target volumes in one-to-one correspondence with the plurality of preset environmental volumes. The relationship curves between preset environmental volumes and characteristic target volumes corresponding to various hearing conditions are determined through the linear fitting or quadratic curve fitting, so as to determine the corresponding relationship of user hearing condition, environmental volume and target volume of the audio device, and then adjust the volume of the audio device according to the corresponding relationship, such that the volume corresponds to both the actual environmental volume and the user.

In order to improve the correlation between preset environmental volume and actual environmental volume to easily determine the target volume corresponding to an actual environmental volume according to the relationship curve between preset environmental volume and actual environmental volume, further, the preset environmental volumes may be obtained by fitting actual environmental volumes and simulated environmental volumes. For example, a plurality of simulated environmental volumes may be set, the actual environmental volumes and the plurality of simulated environmental volumes are fitted to obtain a plurality of preset environmental volumes, and then the plurality of preset environmental volumes are fitted with the characteristic target volumes in one-to-one correspondence with the plurality of preset environmental volumes to further obtain the corresponding relationship of user hearing condition, environmental volume and target volume of the audio device.

It is easy to understand that when a user is close to the audio device, the perceived volume is large; when the user is far from the audio device, the perceived volume is small. To enable the volume of the audio device to be automatically adjusted according to a distance between the user and the audio device, further, as shown in FIG. 1, the method for automatically adjusting volume of the audio device may further include steps of:

S4: detecting the distance between the audio device and the user; and

S5: adjusting, according to the detected distance between the audio device and the user, the volume of the audio device in such a way that the volume of the audio device is increased when the detected distance between the audio device and the user is larger than a preset distance, and the volume of the audio device is decreased when the detected distance between the audio device and the user is smaller than the preset distance.

The "preset distance" refers to the normal range (3-4 m in general) of the distance between the user and the audio device when he/she uses the audio device normally. It can be understood that in daily life, the area of a room where the user is located is limited, the distance between the user and the audio device is generally 1-6 m, and when the change in distance is small, the change in volume perceived by the user is small (for example, when the distance between the user and the audio device is changed from 4 m to 5 m, the change in perceived volume is small). In order to automatically adjust the volume of the audio device according to the distance between the user and the audio device conveniently, when the distance between the audio device and the user is larger than the preset distance, the volume of the audio device is increased (for example, the volume of the audio device is further increased by 5 db after reaching the target volume corresponding to the actual environmental volume and the user); when the distance between the audio device and the user is smaller than the preset distance, the volume of the audio device is decreased (for example, the volume of the audio device is further decreased by 5 db after reaching the target volume corresponding to the actual environmental volume and the user).

The method for automatically adjusting volume of the audio device provided by the embodiments of the present invention is described above, and it can be seen that the method for automatically adjusting volume of the audio device can be used for adjusting the volume of the audio device according to the corresponding relationship of user hearing condition, environmental volume and target volume of the audio device, such that the volume of the audio device corresponds to both the actual environmental volume and the user. Thus, with respect to different users, the volume of the audio device can be automatically adjusted according to the environmental volume, so as to meet the demands of different people and reduce the inconvenience brought by repeated manual volume adjustment of the user. In addition, the method for automatically adjusting volume of the audio device can be used for automatically adjusting the volume of the audio device according to the distance between the user and the audio device, to enable the user to well perceive the sound output from the audio device at different positions and further reduce the inconvenience brought by manual volume adjustment of the user.

Figure 2:
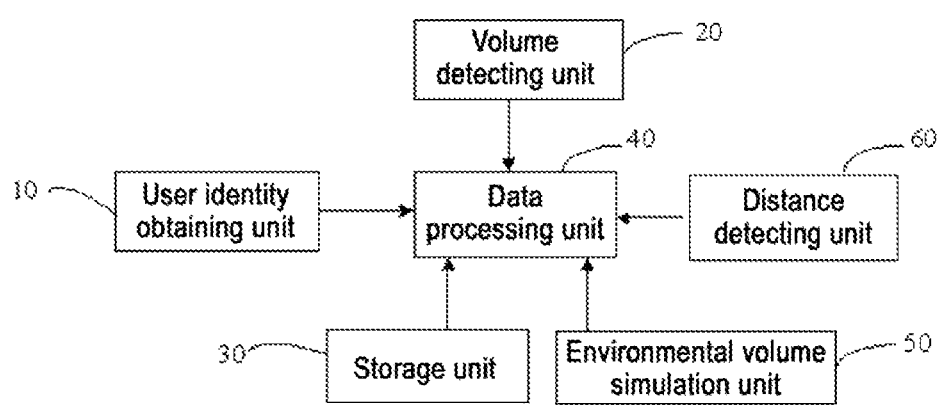
FIG. 2 is a schematic diagram of a structure of an audio device for automatically adjusting volume, provided an embodiment of by the present invention.

As another aspect of the present invention, an audio device for automatically adjusting volume is provided, as shown in FIG. 2, the audio device may include a user identity obtaining unit 10, a volume detecting unit 20, a storage unit 30 and a data processing unit 40. The user identity obtaining unit 10, the volume detecting unit 20 and the storage unit 30 are each electrically connected with the data processing unit 40. The user identity obtaining unit 10 is configured to obtain user identity information; the volume detecting unit 20 is configured to detect an actual environmental volume; the storage unit 30 is configured to store corresponding relationship of user hearing condition, environmental volume and target volume of the audio device, the data processing unit 40 is configured to receive the user identity information obtained by the user identity obtaining unit 10 and the actual environmental volume detected by the volume detecting unit 20, determine user hearing condition according to the user identity information, and adjust a volume of the audio device according to the corresponding relationship of user hearing condition, environmental volume and target volume of the audio device stored in the storage unit 30 so that the volume of the audio device reaches a target volume corresponding to the actual environmental volume and the user hearing condition.

The user identity information may be facial feature information of a user and may also be sound information or other information that can determine the user hearing condition; accordingly, the user identity obtaining unit 10 may include a camera device used for obtaining facial features of the user and may also include a sound receiving device or other device capable of obtaining the user identity information.

In order to enable the data processing unit 40 to accurately adjust the volume of the audio device according to the actual environmental volume and the user hearing condition, further, before the audio device is used, the data processing unit 40 may fit, with respect to each user hearing condition, a relationship curve between a plurality of preset environmental volumes and characteristic target volumes in one-to-one correspondence with the plurality of preset environmental volumes, so as to obtain the corresponding relationship of user hearing condition, environmental volume and target volume of the audio device, and store the corresponding relationship in the storage unit 30.

To conveniently obtain the plurality of preset environmental volumes, further, the audio device may further include: an environmental volume simulation unit 50, which is electrically connected with the data processing unit 40 and is used for simulating the environmental volume; the data processing unit 40 may receive a plurality of preset environmental volumes set by the environmental volume simulation unit 50 and fit the actual environmental volume and the plurality of simulated environmental volumes to obtain the plurality of preset environmental volumes.

To automatically adjust the volume of the audio device according to a distance between a user and the audio device, further, as shown in FIG. 2, the audio device for automatically adjusting volume may further include: a distance detecting unit 60, which is electrically connected with the data processing unit 40 and used for detecting the distance between the user and the audio device; the data processing unit 40 may adjust, according to the distance between the audio device and the user detected by the distance detecting unit 60, the volume of the audio device in such a way that the volume of the audio device is increased when the detected distance between the audio device and the user is larger than a preset distance, and the volume of the audio device is decreased when the detected distance between the audio device and the user is smaller than the preset distance.

In the embodiments of the present invention, the structure of the distance detecting unit 60 is not specifically limited, as long as the distance between the user and the audio device can be detected. As a specific implementation of the present invention, the distance detecting unit 60 may include a camera device and/or an acoustic detection device. The distance between the audio device and the user may be determined according to the size, focal length or other data of the image obtained by the camera device; the acoustic detection device can receive an acoustic signal output from the audio device and reflected by the user so as to detect the distance between the audio device and the user according to the Doppler effect.

It can be understood that the foregoing embodiments are merely exemplary embodiments used for illustrating the principle of the present invention, but the present invention is not limited thereto. Various variations and improvements may be made by a person skilled in the art without departing from the spirit and essence of the present invention, and these variations and improvements should all be encompassed in the protection scope of the present invention.

The invention claimed is:
1. A method for automatically adjusting volume of an audio device, comprising steps of:
   S1: obtaining user identity information;
   S2: detecting an actual environmental volume; and
   S3: determining user hearing condition according to the obtained user identity information, and adjusting a volume of the audio device according to corresponding relationship of user hearing condition, environmental volume and target volume of the audio device, so that the volume of the audio device reaches a target volume corresponding to the detected actual environmental volume and the determined user hearing condition,
   wherein the method further comprises steps, prior to step S3, of:
      obtaining, with respect to each user hearing condition, a plurality of preset environmental volumes and characteristic target volumes in one-to-one correspondence with the plurality of preset environmental volumes;
      obtaining the corresponding relationship of user hearing condition, environmental volume and target volume of the audio device according to the preset environmental volumes and the characteristic target volumes in one-to-one correspondence with the preset environmental volumes; and
      storing the corresponding relationship of user hearing condition, environmental volume and target volume of the audio device,
   and wherein the corresponding relationship of user hearing condition, environmental volume and target volume of the audio device is obtained by performing, with respect to each user hearing condition, linear fitting or quadratic curve fitting on the plurality of preset environmental volumes and the characteristic target volumes in one-to-one correspondence with the plurality of preset environmental volumes.

2. The method for automatically adjusting volume of an audio device of claim 1, wherein the preset environmental volumes are obtained by fitting actual environmental volumes and simulated environmental volumes.

3. The method for automatically adjusting volume of an audio device of claim 1, further comprising steps of:
   S4: detecting a distance between the audio device and a user; and
   S5: adjusting, according to the detected distance between the audio device and the user, the volume of the audio device in such a way that the volume of the audio device is increased when the detected distance between the audio device and the user is larger than a preset distance, and the volume of the audio device is decreased when the detected distance between the audio device and the user is smaller than the preset distance.

4. The method for automatically adjusting volume of an audio device of claim 2, further comprising steps of:
   S4: detecting a distance between the audio device and a user; and
   S5: adjusting, according to the detected distance between the audio device and the user, the volume of the audio device in such a way that the volume of the audio device is increased when the detected distance between the audio device and the user is larger than a preset distance, and the volume of the audio device is decreased when the detected distance between the audio device and the user is smaller than the preset distance.

5. An audio device for automatically adjusting volume, comprising:
   a user identity obtaining unit, configured to obtain user identity information;
   a volume detector, configured to detect an actual environmental volume;
   a storage device, configured to store corresponding relationship of user hearing condition, environmental volume and target volume of the audio device; and
   a data processor, configured to receive the user identity information obtained by the user identity obtaining unit and the actual environmental volume detected by the volume detector, determine user hearing condition according to the user identity information, and adjust a volume of the audio device according to the corresponding relationship of user hearing condition, environmental volume and target volume of the audio device stored in the storage device, so that the volume of the audio device reaches a target volume corresponding to the actual environmental volume and the user hearing condition,
   wherein the data processor fits, with respect to each user hearing condition, a relationship curve of a plurality of preset environmental volumes and characteristic target volumes in one-to-one correspondence with the plurality of preset environmental volumes, to obtain the corresponding relationship of user hearing condition, environmental volume and target volume of the audio device, and stores the corresponding relationship in the storage device.

6. The audio device of claim 5, further comprising: an environmental volume simulator, which is electrically connected with the data processor and used for simulating environmental volume, wherein the preset environmental volumes are obtained by fitting actual environmental volumes and simulated environmental volumes.

7. The audio device of claim 5, further comprising:
a distance detecting unit, which is electrically connected with the data processor and used for detecting a distance between a user and the audio device;
wherein the data processor is capable of adjusting, according to the distance between the audio device and the user detected by the distance detecting unit, the volume of the audio device in such a way that the volume of the audio device is increased when the detected distance between the audio device and the user is larger than a preset distance, and the volume of the audio device is decreased when the detected distance between the audio device and the user is smaller than the preset distance.

8. The audio device of claim 7, wherein the distance detecting unit comprises a camera device and/or an acoustic detection device.

9. The audio device of claim 5, further comprising:
a distance detecting unit, which is electrically connected with the data processor and used for detecting a distance between a user and the audio device;
wherein the data processor is capable of adjusting, according to the distance between the audio device and the user detected by the distance detecting unit, the volume of the audio device in such a way that the volume of the audio device is increased when the detected distance between the audio device and the user is larger than a preset distance, and the volume of the audio device is decreased when the detected distance between the audio device and the user is smaller than the preset distance.

10. The audio device of claim 9, wherein the distance detecting unit comprises a camera device and/or an acoustic detection device.

11. The audio device of claim 6, further comprising:
a distance detecting unit, which is electrically connected with the data processor and used for detecting a distance between a user and the audio device;
wherein the data processor is capable of adjusting, according to the distance between the audio device and the user detected by the distance detecting unit, the volume of the audio device in such a way that the volume of the audio device is increased when the detected distance between the audio device and the user is larger than a preset distance, and the volume of the audio device is decreased when the detected distance between the audio device and the user is smaller than the preset distance.

12. The audio device of claim 11, wherein the distance detecting unit comprises a camera device and/or an acoustic detection device.

* * * * *